July 22, 1952 — H. F. SWENSON — 2,604,307
COMMERCIAL ICE-CREAM FREEZER
Filed July 18, 1949 — 6 Sheets-Sheet 2
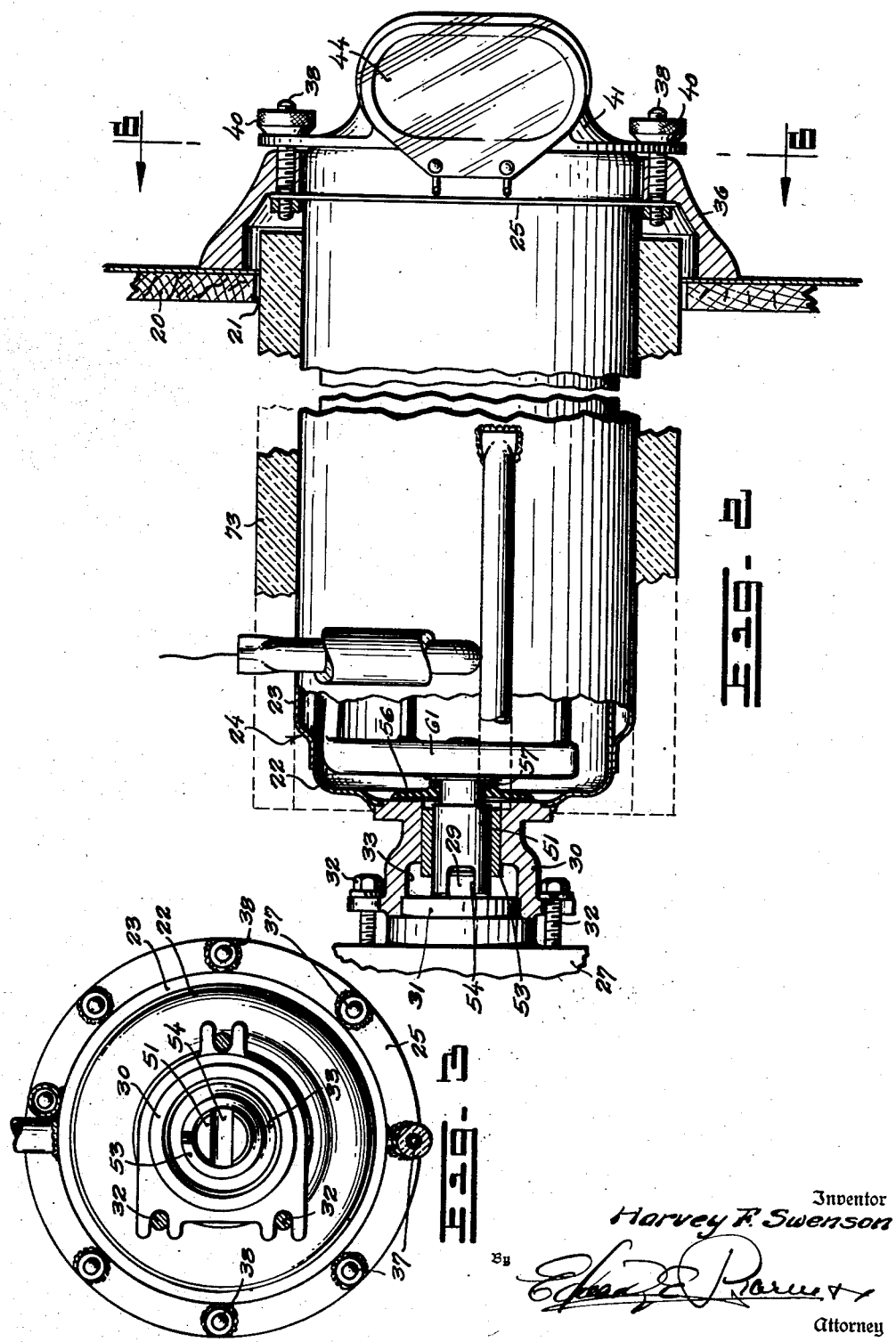
Inventor
Harvey F. Swenson
By
Attorney

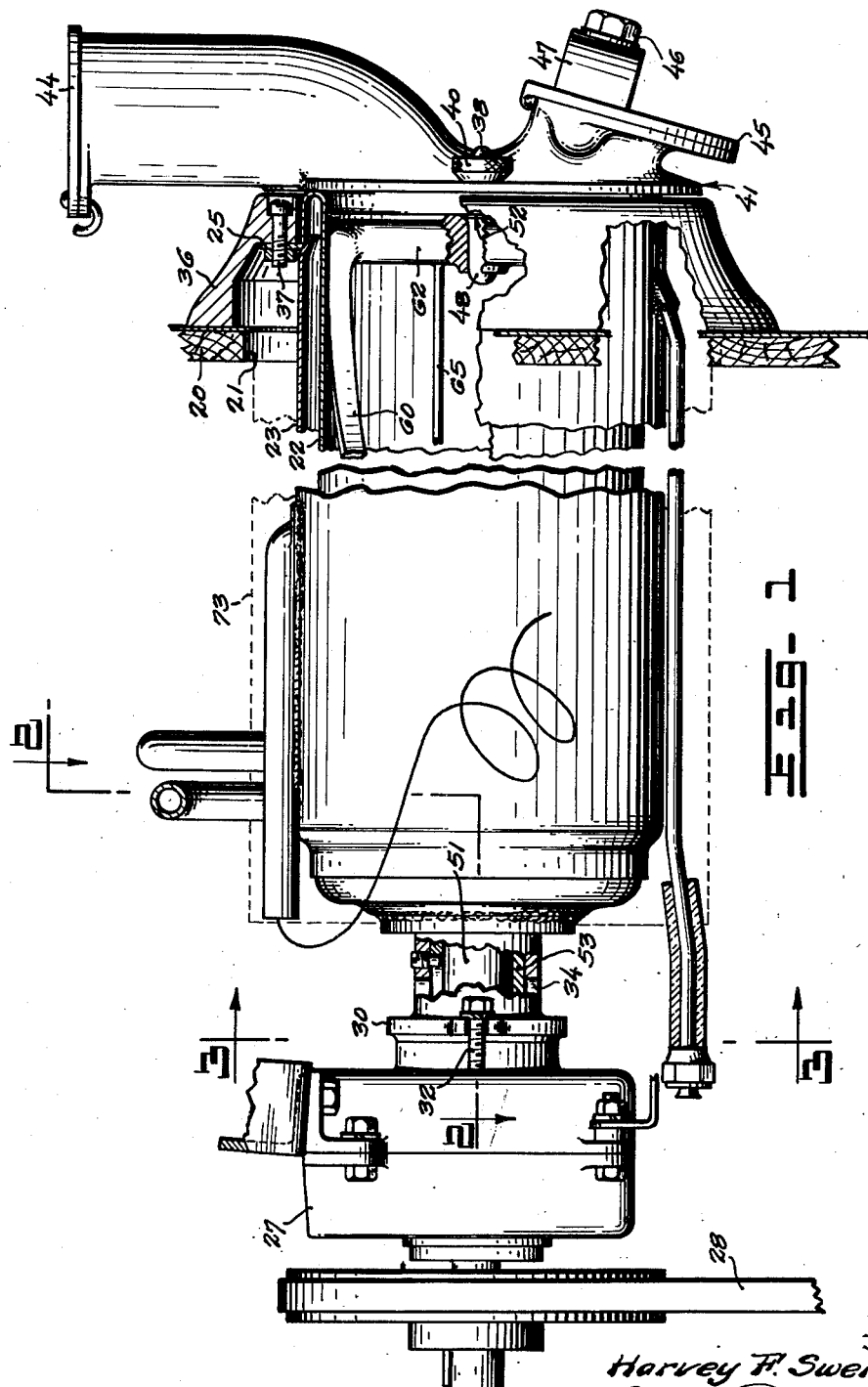

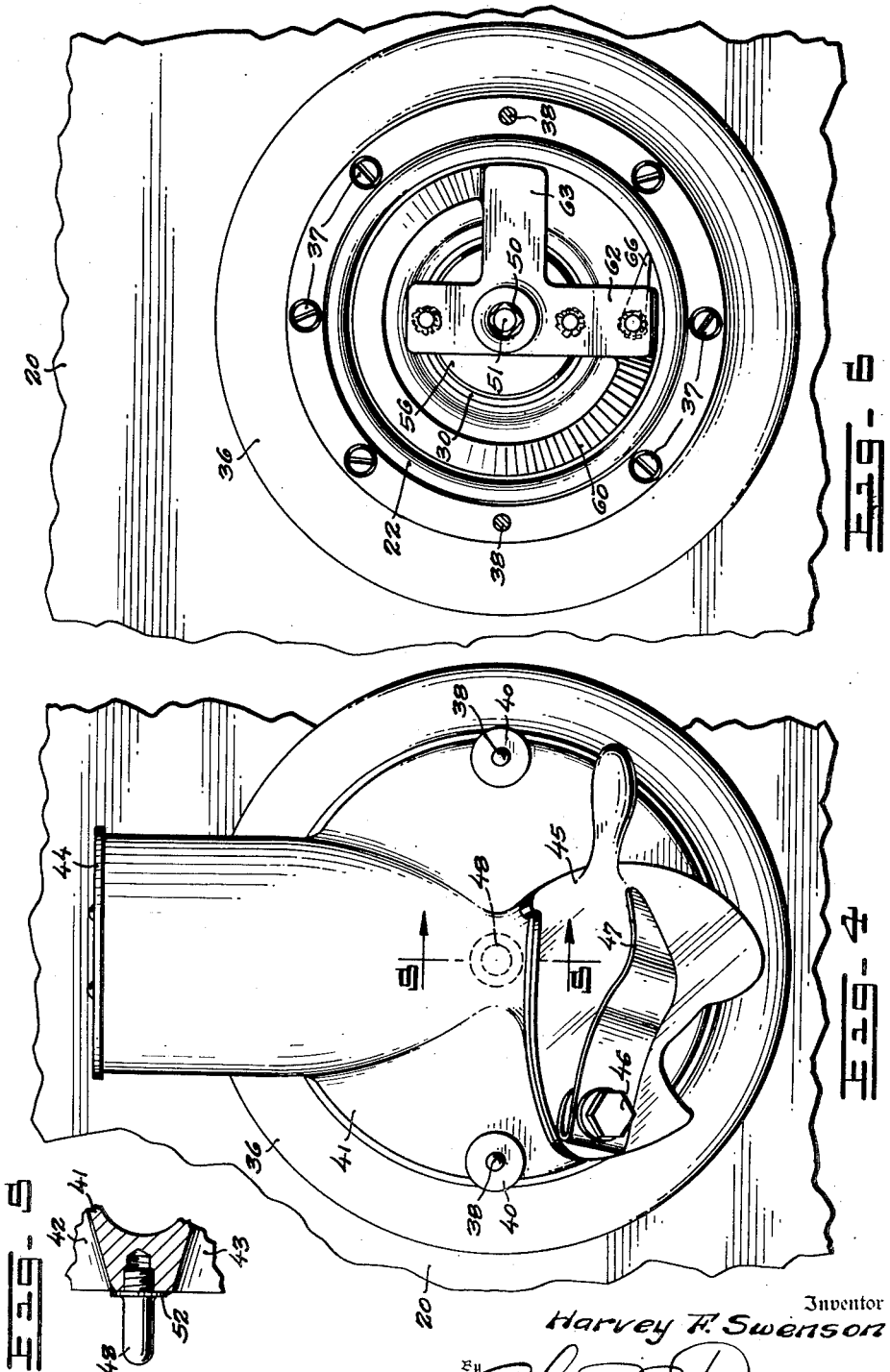

July 22, 1952
H. F. SWENSON
2,604,307
COMMERCIAL ICE-CREAM FREEZER
Filed July 18, 1949
6 Sheets-Sheet 4
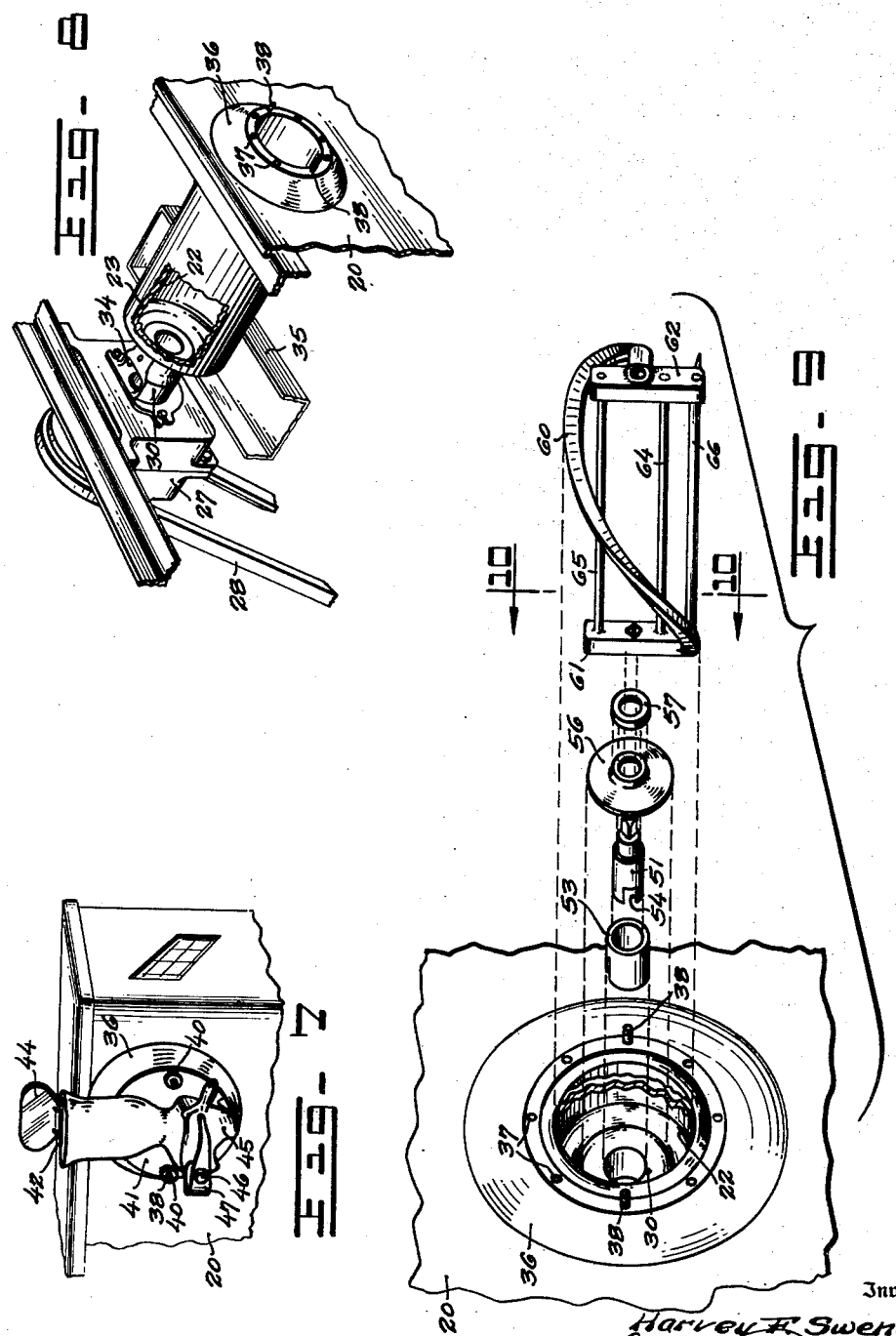
Inventor
Harvey F. Swenson
By
Attorney

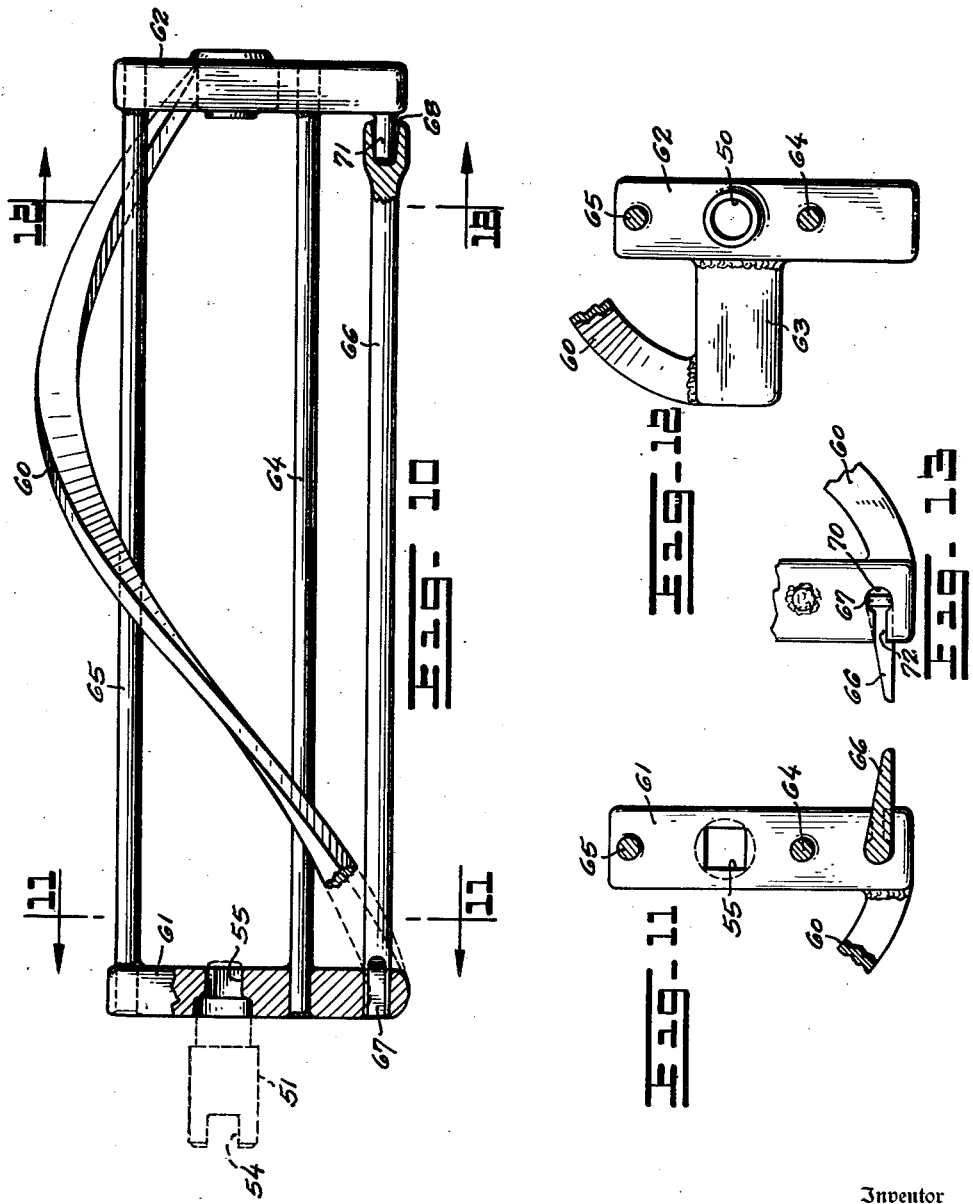

July 22, 1952 H. F. SWENSON 2,604,307
COMMERCIAL ICE-CREAM FREEZER
Filed July 18, 1949 6 Sheets-Sheet 6

INVENTOR.
Harvey F. Swenson

Patented July 22, 1952

2,604,307

UNITED STATES PATENT OFFICE 2,604,307

COMMERCIAL ICE-CREAM FREEZER

Harvey F. Swenson, Seattle, Wash.

Application July 18, 1949, Serial No. 105,377

10 Claims. (Cl. 259—10)

This invention relates to a commercial ice cream freezer, and particularly that type of freezer used with soda fountains and other like establishments catering to the general public and which operates to produce and dispense products in the nature of frozen custards. The freezer, more especially, is of that nature providing a freezing cylinder having an admission opening for periodic introduction of mix and an outlet opening for dispensing the frozen confection, and with a dasher working in the freezing cylinder to whip air into the introduced mix and give proper consistency thereto.

For its principal object the invention aims to provide a freezing machine of generally improved design and one particularly which admits of having the freezing cylinder and all working parts which come into contact with the cream each thoroughly cleaned, and in which this cleaning operation can be carried out with unusual ease and expedition.

It is a further and important object to provide a freezing machine which, for facility and speed in cleaning, is so engineered as to enable the dasher and all working parts touched by the food product to be removed from the machine and completely disassembled without the use of tools.

The invention further aims to provide a machine for the described purpose peculiarized in that all fabricated parts are permanently joined and free of any crack or crevice apt to harbor harmful bacteria, and wherein all corners are rounded and screw holes made bottomless with the assembly being entirely free of any inside threads which, for cleaning, do not admit of being brushed with the thread.

As a further object still, the invention purposes to provide a freezer in which a countershaft having driving connection with the dasher is driven off the output end of a train of housed reduction gears, and wherein the gear housing and the freezing cylinder are close-coupled yet are so isolated one from the other as to preclude either oil from seeping into the cylinder and contaminating the cream mix or cream from seeping into the gear case and damaging the gears.

It is a yet further object of the invention to provide a freezing cylinder of improved construction and one particularly which is made up from two integrated shells each spun to shape and acting in conjunction to produce a hollow-walled structure having the advantage of permitting "flood" freezing.

The invention has the yet further object of devising an improved dasher which is perfected not alone from the standpoint of giving greater ease in cleaning but also to generally simplify the construction with assurance of maximum efficiency in the performance of its intended cream-mixing office.

The foregoing, together with other still more particular objects and advantages in view, will appear and be understood in the following description and claims, the invention consisting in the novel construction and in the adaptation and combination of parts hereinafter described and claimed.

In the accompanying drawings:

Figure 1 is a fragmentary view partly in longitudinal vertical section and partly in elevation illustrating a freezer constructed in accordance with the now preferred embodiment of the present invention.

Fig. 2 is a view thereof partly in top plan and partly in horizontal section with the section taken on line 2—2 of Fig. 1.

Fig. 3 is a transverse vertical sectional view on line 3—3 of Fig. 1.

Fig. 4 is a front elevational view of the freezer with the supporting cabinet shown fragmentarily.

Fig. 5 is a fragmentary longitudinal vertical section on line 5—5 of Fig. 4 to detail the bearing pin which is carried by the freezer front and which forms the journal mounting for the front end of the dasher.

Fig. 6 is a transverse vertical sectional view on line 6—6 of Fig. 2.

Fig. 7 is an exterior fragmentary perspective illustration taken to a reduced scale and viewing the exposed front of the freezer.

Fig. 8 is a perspective view of the freezer with the freezer front removed and incorporating a fragmentary showing of the cabinet parts from which the freezer takes its support, the freezing cylinder having a portion of its wall broken away.

Fig. 9 is an exploded perspective view of the cylinder, its dasher, and the components of the drive through which power is transferred from the reduction gearing to the dasher.

Fig. 10 is a view of the dasher illustrated partly in side elevation and partly in longitudinal vertical section, and incorporating a dotted-line showing of the jack-shaft which drives the dasher.

Figs. 11 and 12 are fragmentary transverse vertical sectional views on lines 11—11 and 12—12, respectively, of Fig. 10.

Fig. 13 is a fragmentary rear elevational view of said dasher detailing the rear-end mounting for the dasher's scraper blade.

Figure 14:
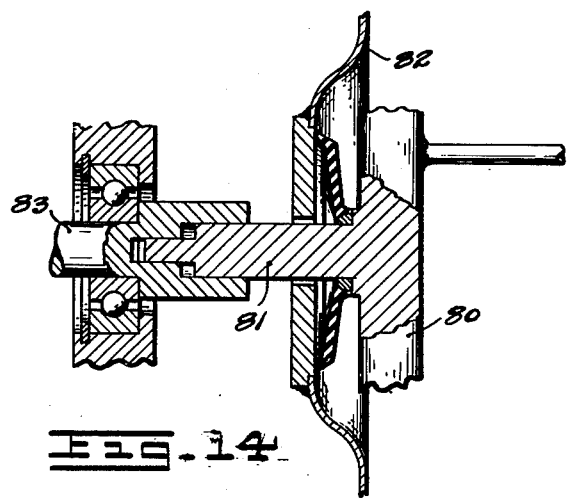
Figure 15:
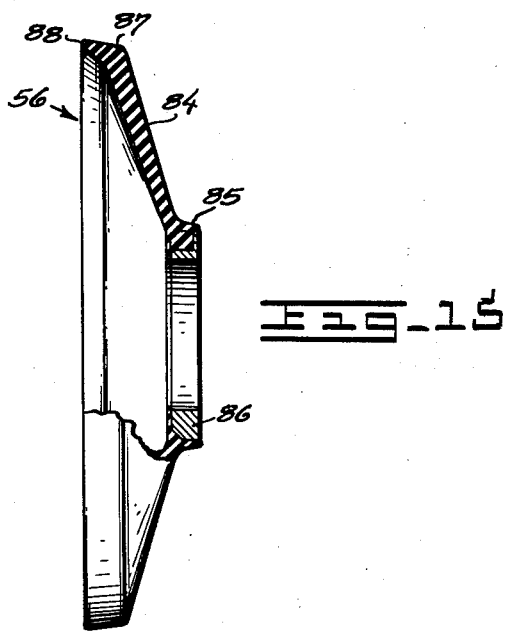

Fig. 14 is a fragmentary longitudinal vertical sectional view detailing a somewhat modified form of dasher in which a drive shaft which is a substantial functioning counterpart of the jack-shaft shown in the preceding views is integrated with the dasher, the structure here shown being further modified in that the freezing cylinder is supported at its rear end independently of the support given to the drive shaft; and Fig. 15 is an enlarged-scale view, partly in section and partly in side elevation, detailing the cream seal shown in the preceding views.

The cabinet for the freezer of the present invention is of ordinary or suitable construction and need not be described other than to point out that the front wall 20 thereof provides a relatively large opening 21, circular in shape, through which the front end of the freezing cylinder protrudes, the cylinder being so mounted as to locate its axis horizontally. Such cylinder is a hollow-walled structure composed of spaced inner and outer shells 22 and 23 joined at the ends of weld seams, and in the forming of the shells to produce the rear-end seam the outer shell has its rear end necked down, as at 24, to closely hug the inner shell. At the front end the outer shell is flared inwardly, and to establish the seam joint the front end of the inner shell is rolled back upon itself to bear snugly against the shoulder defined by the flare and thence carries outwardly to describe a circumscribing flange 25, this flange being pierced at spaced intervals of the circumference to accommodate the reception of mounting bolts, hereinafter to be described. Being of uniform diameter throughout its length, the chamber provided within said cylinder has a full-width opening at the front and a narrower centrally placed opening at the rear, and it is a particular feature of this chamber that the same eliminates the abrupt corner which, in most freezer cylinders, occurs at the juncture between the rear wall and the sides, the shoulder here provided and which I designate by 26 being given a curved contour developed on a radius of, say, ⅜".

Suitably supported within the cabinet to lie in rearwardly spaced relation beyond the rear-end limit of the cylinder is a gear box 27 receiving its drive through a V-belt 28 from a suitable source of energy such, for example, as an electric motor (not shown), and there is contained within this gear box a train of reduction gears establishing a desired ratio of speed as between the motor and a stub output shaft 29 projecting forwardly from the box. Such output shaft presents a terminal tongue and is disposed co-axial to the front opening 21 of the cabinet.

The cylinder, in the embodiment of Figs. 1 through 13, inclusive, derives its rear-end support entirely from the gear box, and for this purpose there is welded or otherwise integrated with the cylinder to extend rearwardly as an axial prolongation thereof a muff-like hub 30 presenting a counter-bore in its rear end; and provided by the gear box to fit in this counter-bore is a boss 31 through which the output shaft projects, the hub being removably clamped to the box by cap-screws 32. The hub, inwardly of the counter-bore, presents a recess 33 of greater diameter than the bore proper, and top and bottom of this recess the walls are cut away to produce a vertical through-opening 34. A removable drip-tray 35 (illustrated in Fig. 8) is supported within the cabinet to occupy a position underlying this through-opening.

To support the front end of the cylinder there is provided a flared collar 36 bolted or otherwise rigidly secured against the front face of the cabinet to lie in concentric surrounding relation to the front opening. The nose of the cylinder, or which is to say that part of the cylinder which projects forwardly beyond the flange 25, projects through and slightly beyond the collar, and the flange is held secure to an inner face of the collar by nutted bolts 37. Two of these bolts, designated by 38 and placed diametrically opposite one another, are of the stud type to present threaded ends exposed to the front of the cabinet, and positioned by these stud-bolts and through the instrumentality of knurled thumb-nuts 40 drawn firmly to bear against the exposed nose of the cylinder is a removable freezer-front 41. Made by preference as a casting, the freezer-front presents an annular boss upon its inner face which finds a snug fit in the nose of the cylinder, and presented in the face of this boss, top and bottom of its center, is the emission end of a feed throat 42 and the admission end of a delivery spout 43. A hinged lid 44 covers the inlet end of said feed throat, and a gate 45, swing-mounted by a pivot bolt 46 and tensioned by a leaf spring 47, serves as a closure for the outlet end of the spout. A hole is drilled and tapped in the substantial center of the boss, thus to lie coaxial to the output shaft of the gear box, and threaded therein is a stubbed journal pin 48 arranged and adapted to fit within a mating socket 50 formed in the front end of a dasher, presently to be described. This pin, in conjunction with a journal-mounted jack-shaft 51 which is in driving engagement with the rear end of the dasher, supports the dasher for rotary movement within the cylinder. The bearing pin provides a thrust shoulder 52. The journal for the jack-shaft comprises a bushing 53 removably fitted in the bore of the hub 30. In the form in which it is illustrated in Figs. 1 through 13, inclusive, the driving jack-shaft is removably coupled both to the output shaft 29 and to the dasher. For this purpose there is cut in the rear end of the jack-shaft a cross-groove 54 into which the tongued end of the stubbed output shaft fits, and at the front end the jack-shaft is made square and fits in a mating socket 55 presented by the dasher. A cream seal 56 is received upon the jack-shaft and through an intervening friction washer 57 is tensioned by the dasher to bear tightly against the front face of the hub. This cream seal is an important part of the invention and will be hereinafter described in detail.

Proceeding now to describe the dasher, detailed in Figs. 10 through 13, inclusive, it will be seen that the dasher blade 60, which sectionally is of rectangular form, is spirally developed through an approximate 270° turn while at the same time being given a gradual twist holding the major axis of the section constantly on a radius of the center about which the spiral is developed. The dasher provides two longitudinally spaced header bars 61 and 62, each disposed normal to the axis of rotation of the dasher, and the two sockets 50 and 55, one to receive the journal pin 48 and the other to receive the squared end of the jack-shaft, are formed in these header bars. The coaxial sockets are placed somewhat off the center of the bars, length considered, and hence provide for each said header bar a long arm at one side and a short arm at the other side of the rotary axis. The dasher blade extends between these header bars and has its two ends welded or otherwise integrally joined thereto, one said end stemming from a side edge of the header bar 61 at the outer extremity of the long arm and the other end connecting with an outrigger branch 63 of the header bar 62. To give stability to the dasher frame, stay rods 64 and 65 are provided, these rods running parallel to the rotary axis and being located equidistantly at opposite sides thereof. The dasher is completed by a scraper blade 66 removably carried by the header bars at the outer extremity of the long arms thereof. This blade is suggestive of an ovate-lanceolate shape in section, and made a part thereof and extending as a prolongation beyond one end of the ovate portion is a pin 67. There is provided in the opposite end of said scraper blade and located co-axial to the pin a bearing socket 68, and for the mounting of the scraper blade this pin and socket are respectively journaled the one in a hole 70 drilled through the header bar 61 and the other on a pin 71 integrated with and pointing inwardly from the header bar 62. Pin 67 is flattened upon opposite sides to constitute a substantial tongue and admits of being removably introduced to its drill-hole through a narrow throat 72 describing, with the drill hole, a substantial key-hole slot, the said throat lying substantially at right angles to radius projected from the center of the dasher through the drill-hole, and the tongue lying substantially at right angles to the median plane of the blade. When the dasher occupies its operating position within the cylinder of the freezer, the described arrangement precludes the tongue from becoming dislodged from its bore in that the permitted swivel movement of the blade, limited in one direction by the interior wall of the cylinder and in the other direction by the stay rod 64, is short of the movement necessary to bring the tongue into line with the throat.

The freezing cylinder of the present invention, providing as it does a hollow wall containing the refrigerant, is of the flooded type as distinguished from the more usual arrangement of a spirally wrapped tube encircling the cylinder. This type of freezer has the advantage of establishing maximum contact of the refrigerant with the cylinder wall and gives quicker freezing with proportionately higher compressor efficiency. I profess no novelty in and to the freezing system and it is believed unnecessary to refer in detail to the controls nor to the indicated pipes which, with the cylinder and the compressor (not shown), provide for the circulation of the refrigerant. For insulating the cylinder I prefer to employ a blanket 73 of cellular rubber. Characterized in that each of the multiple cells are completely isolated one from another, this produces an unusually effective insulation, but here again I profess no novelty to the use of the material in question, its development having resulted from extensive experiments conducted by the armed forces toward obtaining a substance which would eradicate the troublesome tendency of most insulations to draw moisture.

A feature which I deem to be of major import in the present invention is the case with which the dasher and its associated jackshaft assembly can be removed, and all parts including the cylinder and its hub quickly and thoroughly cleaned. In order to remove the dasher it becomes necessary only that the two exposed thumb nuts 40 be backed off from the stud bolts 38, whereupon the operator takes off the freezer front 41. The interior of the cylinder is now exposed and the dasher and its associated jack-shaft can be drawn freely through the front opening. The parts so withdrawn are readily dismantled one from another, and the freezing chamber of the cylinder, now exposed for cleaning, is free of any crevices which might hamper thorough removal of adherent cream. The bushing which fits within the bore of the cylinder hub is made removable, and the bore cleaned by introducing a brush from the cylinder side, and this brush is also employed to clean the drain opening 34 by removing the cabinet top and passing the brush vertically through such opening. The drip pan 35 is removable through an opening in the side wall of the cabinet normally occupied by a removable grill (not shown). After cleaning, the parts are reassembled and reintroduced to the machine, with the freezer front being reapplied upon the front end of the cylinder and the two thumb nuts tightened down to hold the same firmly in position. No tool whatever is required in order to remove the dasher and disassemble the parts, nor to reassemble the same, return the parts to the machine, and again put the latter in operating condition, the entire operation being quickly performed.

There is a further feature of not inconsiderable importance and that is the fact of the gear case and the cylinder being so isolated one from another as to positively preclude spoilage of the mix by oil seeping from the gear case into the cylinder or liability of the gears contained in the case from being damaged in consequence of cream seeping into the case. The pocket within the cylinder hub which lies to the rear of the bore effectively traps any such seepage and directs the latter through the drip opening into the underlying removably mounted drip pan.

Rather than make the jack-shaft a separate part from the dasher, as hereinbefore described, the advantages inherent thereto can also be obtained by a somewhat modified arrangement in which the dasher has the jack-shaft integrally produced as an axial prolongation thereof, an embodiment incorporating such an arrangement being illustrated in Fig. 14 wherein I denote the rear header bar of the dasher by 80 and its said axial prolongation by 81. In this said embodiment, I have shown the machine as one in which the freezing cylinder, here designated by 82, would have a rear-end support separate and apart from the support given to the prolongation 81, but still retaining much the same form of detachable coupling for connecting the rear end of said prolongation to a power shaft 83, and namely a coupling comprised of a tenon-like tongue formed upon one said part and fitting in a mating socket of the other.

Reverting now to the cream-seal 56, the same is comprised of a generally cone-shaped body 84 of elastic rubber having a localized hub section 85 which is vulcanized to a metal ring 86, and with the rubber of the body being quite thin adjacent its hub and thence gradually increasing in thickness toward a rim section 87 which again thins down to a substantial feather-edged annular lip 88. As applied to the machine, the metal ring, either with or without an intervening washer (portrayed in Figs. 2 and 9), shoulders against the dasher and causes the feather-edged lip 88 to bear against the rear wall of the freezing cylinder in surrounding relation to the latter's rear-end opening. Now, as the introduced dasher is pushed inwardly into its operating position, it compacts the cream seal into a smaller than normal axial compass and causes the thickened section or rubber to become radially displaced with the result that the lip section is stretched. This lip section, rather than obtaining its sealing pressure in the manner which would ordinarily be expected, namely by compression pressure, is caused to be distorted by the expansive stretch and puts the rubber lip under tension. The triangular shape of the rubber, considered in radial section, makes it possible to obtain this very desirable stretch-resisting pressure, the tensioned or stretched surface being the inner face of the conical body or that surface which corresponds to the long side of the triangular section. A point of not inconsiderable importance in respect of the described seal is that the same will efficiently perform its sealing office even though the dasher may, through imperfect mounting, be slightly out of axial alignment with the driving shaft, and which is apt to occur in a construction such as I illustrate in Fig. 14.

It is thought that the invention will have been clearly understood from the foregoing detailed description of my now preferred embodiment. Minor changes may be resorted to without departing from the spirit of the invention and it is accordingly my intention that the hereto annexed claims be given a construction fully commensurate with the broadest interpretation to which the employed language fairly admits.

What I claim is:

1. In a commercial ice cream freezer, a cabinet having an opening in its front wall, an open-front freezing cylinder received in the cabinet with its front end supported by the cabinet in registration with said front-wall opening, a center-bored hub extending rearwardly as an axial prolongation of the cylinder, a gear case supported within said cabinet to the rear of the hub and giving support in turn to the rear end of the hub, said gear case containing power-driven reduction gears and presenting a stubbed output shaft placed co-axial to the hub and projecting into the latter, a jack-shaft journaled within the hub with its rear end jaw-coupled to the output shaft and its front end projecting into the cylinder, a rotary dasher working in the cylinder and receiving its drive from said front end of the jack-shaft, a removable freezer-front for the cylinder, and clamp devices carried by the front wall of the cabinet and arranged to engage said freezer-front and tension the same to establish a tight pressure fit closing the open front of the cylinder.

2. In a commercial ice cream freezer, a cabinet having an opening in its front wall, a mounting ring secured upon said front wall of the cabinet to circumscribe the front-wall opening, a horizontally disposed open-front freezing cylinder received in the cabinet and secured by its front end to the mounting ring to have the nose project through and beyond the latter, said cylinder having a centrally apertured rear wall, a rigid support for the rear end of said cylinder, a rotary dasher working in the cylinder, a removable freezer-front for the cylinder fitting over the open front of the latter and presenting means giving journal support for the front end of the dasher, a power-driven shaft journal-mounted at the rear end of the cylinder for rotation about an axis coinciding with the dasher's front end support, and means extending through said central aperture of the rear wall and establishing a driving connection from said shaft to the dasher.

3. Structure according to claim 2 in which the dasher's front end journal support serves the added end of a thrust bearing, and a seal tensioned to bear against the rear wall of the cylinder by end pressure transmitted from the freezer front through said thrust bearing to the dasher.

4. In a commercial ice cream freezer, a cabinet having an opening in its front wall, a mounting ring secured upon said front wall of the cabinet to circumscribe the front-wall opening and presenting stud bolts exposed to the front of the cabinet and located at equidistant intervals of the circumference, an open-front freezing cylinder received in the cabinet and secured to the mounting ring to have the nose project through and beyond the latter, a rigid support for the rear end of said cylinder, a rotary dasher received in the cylinder, a power-driven shaft journal-mounted at the rear end of the cylinder and having its front end projecting into the cylinder and drive-coupled to the dasher, a removable freezer-front for the cylinder presenting bolt-holes arranged to register with the stud-bolts and providing means upon its inner face giving journal support for the front end of the dasher, and thumb nuts for the stud bolts arranged to bear upon the freezer-front and draw the same tight against the nose of the cylinder.

5. In a commercial ice cream freezer, an open-front freezing cylinder mounted to occupy an approximate horizontal axis and having a centrally placed center-bored hub integrated with the rear wall, a driving shaft journaled in the bore of said hub and projecting forwardly into the cylinder, a freezer-front, means for drawing said freezer-front tight against the cylinder to operate as a closure for the front opening, said freezer-front providing a thrust and journal bearing exposed to the inner side thereof and arranged, when the freezer-front is applied to the cylinder, to lie coaxial to the shaft, a dasher received in the cylinder with its rear end detachably coupled to the inwardly projecting end of the driving shaft and finding support for its front end from said thrust and journal bearing, and an elastic disc between the rear wall of the cylinder and adjacent end of the dasher serving as a cream seal and caused by end force transmitted from the applied freezer-front to the dasher to be compressed between the rear end of the dasher and the rear wall of the cylinder.

6. In a commercial ice cream freezer, an open-front freezing cylinder mounted to occupy an approximate horizontal axis and having a centrally placed opening in the rear wall, a freezer-front arranged to be clamped tightly over said open front and presenting an inwardly directed bearing pin disposed co-axial to the cylinder, a dasher received in the cylinder with its front end journaled on the bearing pin and having its rear end sustained by a drive shaft placed co-axial to the bearing pin and projecting through said rear-wall opening of the cylinder, a ring of elastic rubber surrounding said shaft between the rear wall of the cylinder and adjacent end of the dasher and by end force transmitted from the freezer-front to the dasher caused to be distorted and its rim stretched to tension said rim against the back wall of the cylinder and seal the latter against rear-end leakage, and means for driving said shaft.

7. In a commercial ice cream freezer, an open-front freezing cylinder mounted to occupy an approximate horizontal axis and having a centrally placed center-bored hub in the rear wall, a freezer-front arranged to be clamped tightly over said open front and presenting an inwardly directed bearing pin disposed co-axial to the cylinder, a shaft placed co-axial to the bearing pin and receiving a journal mounting in the bore of the hub, a dasher received in the cylinder with its front end journaled on the bearing pin and having its rear end sustained by and driven from said shaft, and means for driving said shaft, a cone-shaped ring of elastic rubber received on said shaft with its reduced end lying to the front and subjected to endwise thrust from the rear end of the dasher so that the wide end of the ring bears against the rear wall of the cylinder to seal the bore of the hub against leakage of cream contained in the cylinder.

8. In a commercial ice cream freezer, an open-front freezing cylinder mounted to occupy an approximately horizontal axis and having a centrally apertured rear wall, a center-bored hub integrated with the rear wall of the cylinder and projecting rearwardly as an axial prolongation thereof, a casing for power-driven reduction gears made secure to the rear end of said hub and presenting a stubbed output shaft placed co-axial to the bore of the hub and projecting into the rear end of the latter, a jack-shaft journaled in the bore of the hub with its rear end drive-coupled through a slip-fit connection with the output shaft and projecting by its front end into the cylinder, a rotary dasher received in the cylinder and drive-coupled through a slip-fit connection with said front end of the jack-shaft, a freezer-front for closing the open front of the cylinder removably secured in position and providing a slip-fit journal supporting the front end of the dasher, said slip-fit journal for the front end of the dasher subjecting the dasher to end thrust, and a ring-seal of elastic rubber fitting over the front end of the jack-shaft to occupy a position between the dasher and the rear wall of the cylinder and by end pressure transmitted from the freezer-front to the dasher caused to be distorted and its rim stretched for tensioning said rim to hold the same tight against the cylinder's rear wall.

9. In a commercial ice cream freezer, an open-front freezing cylinder mounted to occupy an approximately horizontal axis and having a centrally apertured rear wall, a center-bored hub integrated with the rear wall of the cylinder and projecting rearwardly as an axial prolongation thereof, a casing for power-driven reduction gears made secure to the rear end of said hub and presenting a stubbed output shaft placed co-axial to the bore of the hub and projecting into the rear end of the latter, a jack-shaft journaled in the bore of the hub with its rear end drive-coupled through a slip-fit connection with the output shaft and projecting by its front end into the cylinder, a rotary dasher received in cylinder and drive-coupled through a slip-fit connection with said front end of the jack-shaft, and a freezer-front for closing the open front of the cylinder removably secured in position and providing a slip-fit journal supporting the front end of the dasher, said hub providing a counter-bore at its rear end serving as a pocket for trapping cream or oil seeping either rearwardly from the cylinder or forwardly from the gear case, and having its wall pierced with a through-opening traversing said pocket, the stubbed output shaft terminating short of said pocket to leave the pocket unobstructed for cleaning purposes when the dasher is removed from the cylinder and the jack-shaft disengaged from said output shaft and withdrawn from the hub.

10. In a commercial ice-cream freezer, an open-front freezing cylinder having a centrally placed opening in the rear wall, a freezer-front arranged to be clamped tightly over said open front and having a thrust and journal bearing exposed to the inner side thereof and so positioned as to lie co-axial to the cylinder when the freezer-front is applied to the cylinder, a dasher received in the cylinder and finding support for its front end from said thrust and journal bearing, a drive shaft sustaining the rear end of the dasher, said drive shaft being placed co-axial to the cylinder and projecting through said rear opening of the cylinder, a ring of elastic rubber surrounding said shaft between the rear wall of the cylinder and adjacent end of the dasher and by end force transmitted from the freezer-front to the dasher caused to be distorted and its rim stretched to tension said rim against the back wall of the cylinder and seal the latter against rear-end leakage, and means for driving said shaft.

HARVEY F. SWENSON.

REFERENCES CITED

The following references are of record in the file of this patent:

UNITED STATES PATENTS

| Number | Name | Date |
| --- | --- | --- |
| 952,031 | Dickson | Mar. 15, 1910 |
| 1,089,094 | Tyson | Mar. 3, 1914 |
| 1,116,177 | Wakefield | Nov. 3, 1914 |
| 2,134,268 | Swenson | Oct. 25, 1938 |
| 2,191,344 | Erickson et al. | Feb. 20, 1940 |
| 2,243,317 | Phelan | May 27, 1941 |
| 2,283,487 | Boileau | May 19, 1942 |
| 2,314,598 | Phelan | Mar. 23, 1943 |
| 2,426,368 | Mayne | Aug. 26, 1947 |
| 2,474,730 | Espinasse | June 28, 1949 |